No. 795,503. PATENTED JULY 25, 1905.
J. S. GARETHUN.
PORTABLE STOCK HOLDING APPLIANCE.
APPLICATION FILED JUNE 25, 1904.
2 SHEETS—SHEET 2.
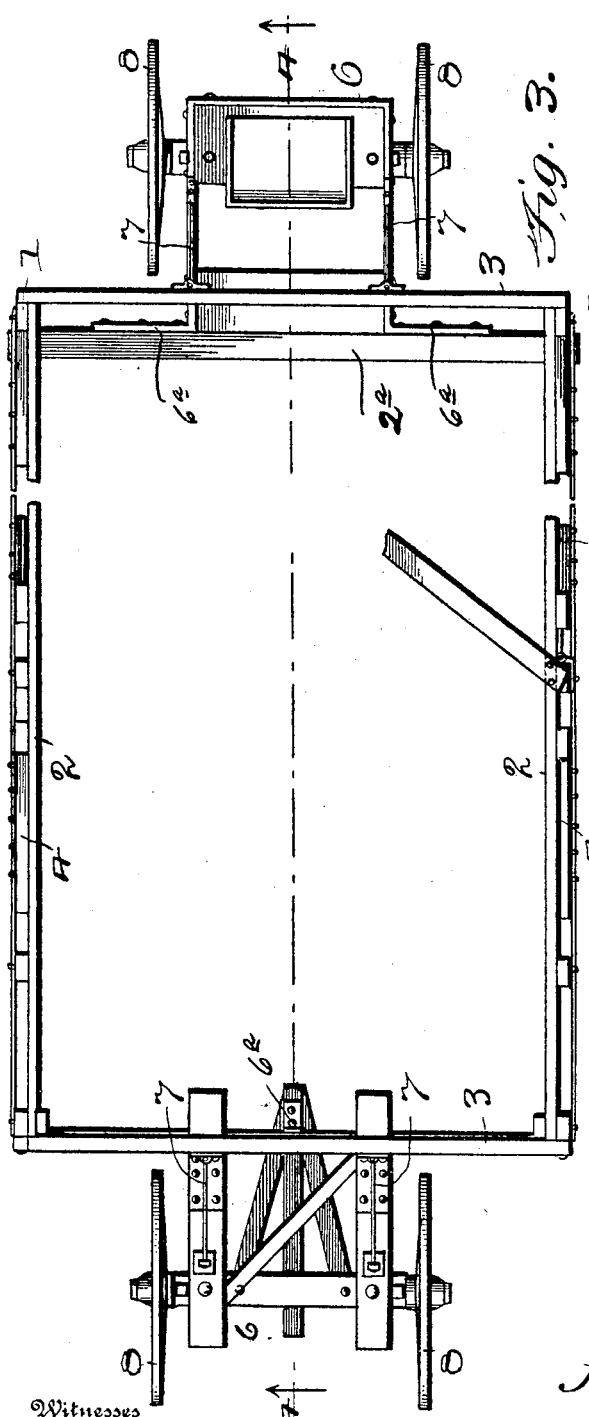
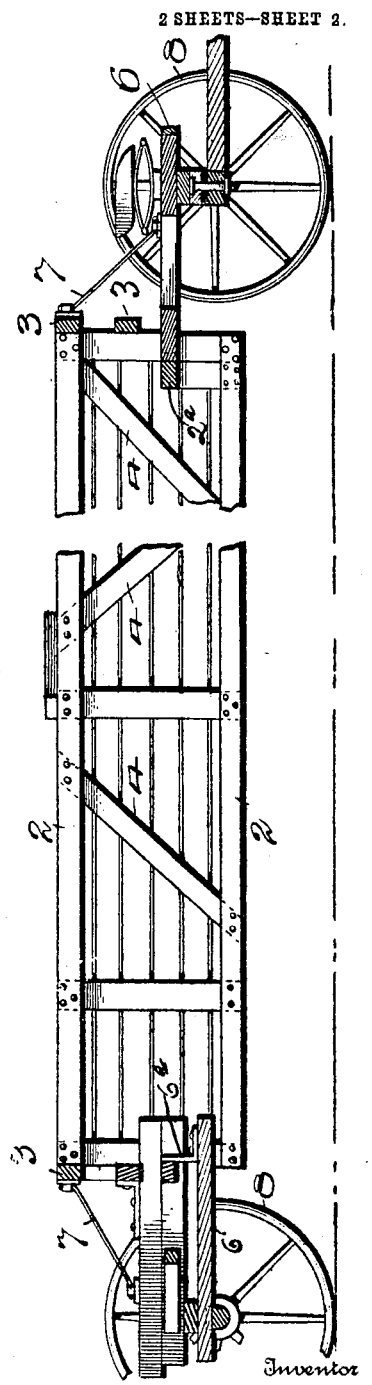

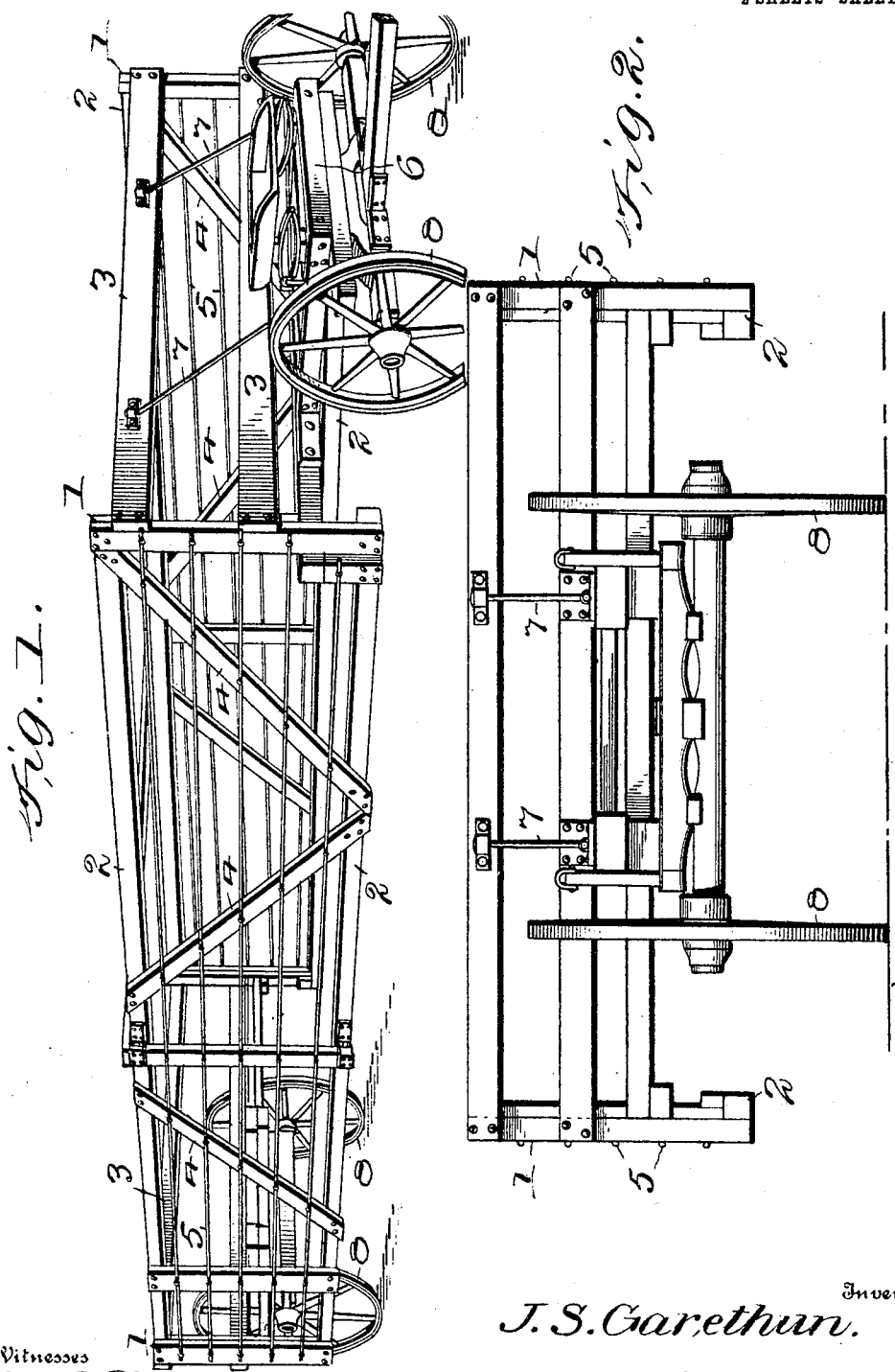

UNITED STATES PATENT OFFICE.

JACOB S. GARETHUN, OF AIRLIE, MINNESOTA.

PORTABLE STOCK-HOLDING APPLIANCE.

No. 795,503.   Specification of Letters Patent.   Patented July 25, 1905.

Application filed June 25, 1904. Serial No. 214,162.

*To all whom it may concern:*

Be it known that I, JACOB S. GARETHUN, a citizen of the United States, residing at Airlie, in the county of Pipestone and State of Minnesota, have invented certain new and useful Improvements in Portable Stock-Holding Appliances; and I do hereby declare the following to be a full, clear, and exact description of the invention, such as will enable others skilled in the art to which it appertains to make and use the same.

My invention relates to a portable stock-holding appliance or pen for animals of that class wherein the animals are inclosed and forced to walk along the roadway or from one field to another; and it consists of certain novel features of combination and construction of parts, the preferred form whereof will be hereinafter clearly set forth, and pointed out in the claims.

The objects and advantages will be hereinafter made clearly apparent, reference being had to the accompanying drawings, which are made a part of this application, and in which—

Figure 1 shows a perspective view of my invention complete ready for use. Fig. 2 is a front elevation thereof. Fig. 3 is a top plan view of my invention complete as shown in Fig. 1, while Fig. 4 shows a longitudinal central section as taken on line 4 4 of Fig. 3.

For convenience of reference to the various details and coöperating accessories of my invention numerals will be employed, the same numeral applying to a similar part throughout the several views.

Briefly stated, my invention consists of a suitable pen or inclosure comprising strong and rigid framework having suitable projections upon each end for coöperation with a carrying-truck, whereby the entire compartment may be lifted bodily from the ground, it being understood that a suitable door or gateway is also provided to admit the animals within the pen.

Referring to the numerals on the drawings, 1 designates the corner sections or posts of the framework, which may be of any preferred size and any suitable material, suitable side bars 2 being provided and properly connected to the corner-posts in any desired manner. I also provide the end sections 3 of any desired number, it being understood that any preferred dimensions may be adopted in forming the pen, as the latter may be made any desired weight or length, according to the purpose to which it is to be applied. The side bars and end sections are supplemented and reinforced or strengthened by means of suitable bracing-bars 4 and also by a plurality of wires 5, connected to the end posts and intermediate sections in the usual or any preferred way, thus insuring the greatest rigidity and strength consistent with a minimum weight.

To the end sections 3 I secure the forwardly-projecting frame 6, which is properly braced or reinforced on each side by the brackets or downwardly-inclined arms 7, extending from the top end section 3, as shown in Fig. 4, and it is therefore obvious that by placing suitable trucks, as designated by the numeral 8, under the extensions 6 the entire pen is made portable, and since there is no bottom in the pen the cattle or other stock inclosed therein are forced to walk along as the trucks are drawn over the ground.

As seen in Figs. 3 and 4, the frames 6 are secured within the ends of the framework by means of the angle-irons $6^a$, the angle-irons at the forward end being secured to the cross-timber $2^a$, as seen best in Fig. 3.

My improved portable stock-pen may be drawn along any ordinary roadway and over bridges and culverts of the usual width and construction until the stock within the pen has been conveyed to the desired point, when a suitable gateway of any desired character may be opened to release the animals.

My invention will be found very desirable and useful for a great variety of purposes, as for conveying unruly animals from the farm to the stock-yards and for enabling the pen to be easily moved from one point to another and again deposited upon the ground.

The various parts of my invention may be cheaply and expeditiously manufactured and readily assembled each in its respective operative position, and while I have described the preferred combination and construction of parts I desire to comprehend in this application all substantial equivalents and substitutes falling fairly within the scope and purview of my invention.

What I claim as new, and desire to secure by Letters Patent, is—

1. The herein-described portable stock-pen comprising a rigid frame suitably reinforced and strengthened to insure great rigidity and lightness; rigid reinforced extensions upon opposite ends of the framework, means bracing the ends of the framework to said extensions and wagon-trucks supporting said extensions beyond the ends of said framework, said extensions being extended in both directions beyond the ends of the framework and secured within the ends thereof.

2. The herein-described portable stock-pen comprising a rigid frame suitably reinforced and strengthened to insure great rigidity and lightness, rigid reinforced extensions upon opposite ends of the framework, means bracing the ends of the framework to said extensions and wagon-trucks supporting said extensions beyond the ends of said framework, said extensions being extended in both directions beyond the ends of the framework and secured within the ends thereof, and the end sections to said framework being disposed between the inner ends and the bolsters of the truck, as set forth.

In testimony whereof I have signed my name to this specification in the presence of two subscribing witnesses.

JACOB S. GARETHUN.

Witnesses:
 E. E. RODDIS,
 S. B. ROCKEY.